(12) United States Patent
Poirot-Crouvezier

(10) Patent No.: US 10,283,798 B2
(45) Date of Patent: May 7, 2019

(54) FLUID FLOW GUIDE PLATE FOR ELECTROCHEMICAL REACTOR, AND ASSEMBLY COMPRISING SAID PLATE

(71) Applicant: COMMISSARIAT A L'ENERGIE ATOMIQUE ET AUX ENERGIES ALTERNATIVES, Paris (FR)

(72) Inventor: Jean-Philippe Poirot-Crouvezier, Saint Georges de Commiers (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 251 days.

(21) Appl. No.: 15/507,432

(22) PCT Filed: Sep. 16, 2015

(86) PCT No.: PCT/FR2015/052487
§ 371 (c)(1),
(2) Date: Feb. 28, 2017

(87) PCT Pub. No.: WO2016/042268
PCT Pub. Date: Mar. 24, 2016

(65) Prior Publication Data
US 2017/0283963 A1    Oct. 5, 2017

(30) Foreign Application Priority Data

Sep. 19, 2014 (FR) ..................... 14 58850

(51) Int. Cl.
*H01M 8/02* (2016.01)
*H01M 8/10* (2016.01)
(Continued)

(52) U.S. Cl.
CPC .............. *H01M 8/10* (2013.01); *H01M 8/02* (2013.01); *H01M 8/026* (2013.01);
(Continued)

(58) Field of Classification Search
CPC ............ H01M 8/10; H01M 8/24; H01M 8/02; H01M 8/241; H01M 8/026; H01M 8/0258; H01M 2008/1095
See application file for complete search history.

(56) References Cited

U.S. PATENT DOCUMENTS

2007/0178359 A1    8/2007  Peng et al.
2011/0165500 A1    7/2011  Wagner et al.
(Continued)

FOREIGN PATENT DOCUMENTS

EP    2 299 527 A1    3/2011

OTHER PUBLICATIONS

International Search Report dated Dec. 11, 2015 in PCT/FR2015/052487 filed Sep. 16, 2015.

*Primary Examiner* — Stewart A Fraser
(74) *Attorney, Agent, or Firm* — Oblon, McClelland, Maier & Neustadt, L.L.P.

(57) ABSTRACT

A fluid flow guide plate for an electrochemical reactor. The plate includes, on a single surface: a flow collector; a plurality of flow channels, provided on the plate to ensure fluid flow and extending in a single longitudinal direction; an exchange channel, extending in a direction transverse to the flow channels; a plurality of supply channels that are fluidly connected, on a first side, to the flow collector by a first end and, on a second side, to the exchange channel by a second end. The exchange channel puts the flow channels in communication with one another and includes at least one obstacle provided to partially close off the flow between the second ends and the flow channels.

13 Claims, 3 Drawing Sheets

(51) Int. Cl.
    *H01M 8/24*         (2016.01)
    *H01M 8/241*       (2016.01)
    *H01M 8/0258*     (2016.01)
    *H01M 8/026*       (2016.01)
    *H01M 8/1018*     (2016.01)

(52) U.S. Cl.
    CPC ........... H01M 8/0258 (2013.01); H01M 8/24 (2013.01); H01M 8/241 (2013.01); *H01M 2008/1095* (2013.01)

(56) References Cited

U.S. PATENT DOCUMENTS

| | | |
|---|---|---|
| 2011/0207018 A1 | 8/2011 | Nakagawa et al. |
| 2013/0316263 A1 | 11/2013 | Roshanzamir et al. |
| 2015/0333344 A1* | 11/2015 | Hood .................. H01M 8/0258 429/434 |
| 2015/0333345 A1* | 11/2015 | Hood .................. H01M 8/0258 429/434 |
| 2015/0349353 A1* | 12/2015 | Hood .................. H01M 8/0258 429/514 |
| 2017/0110739 A1* | 4/2017 | Andreas-Schott .......................... H01M 8/0202 |

* cited by examiner

FLUID FLOW GUIDE PLATE FOR ELECTROCHEMICAL REACTOR, AND ASSEMBLY COMPRISING SAID PLATE

The invention relates to fuel cells, and in particular fuel cells comprising an alternation of proton exchange membranes and bipolar plates.

Fuel cells are envisaged as electrical supply systems for mass-produced automotive vehicles in the future, and also for a large number of applications. A fuel cell is an electrochemical device that converts chemical energy directly into electrical energy. A fuel such as molecular hydrogen or methanol is used as fuel for the fuel cell.

In the case of molecular hydrogen, the latter is oxidized and ionized on an electrode of the fuel cell and an oxidant is reduced on another electrode of the fuel cell. The chemical reaction produces water at the cathode, oxygen being reduced and reacting with the protons. The great advantage of the fuel cell is that it avoids discharges of atmospheric polluting compounds on the site of electricity generation.

Proton exchange membrane (PEM) fuel cells operate at low temperature and have particularly advantageous compactness properties. Each individual cell comprises an electrolytic membrane that allows only protons to pass through and not electrons. The membrane comprises an anode on a first face and a cathode on a second face in order to form a membrane electrode assembly (MEA).

At the anode, the molecular hydrogen is ionized in order to produce protons that pass through the membrane. The electrons produced by this reaction migrate toward a flow plate, then pass through an electrical circuit external to the individual cell in order to form an electric current. At the cathode, oxygen is reduced and reacts with the protons to form water.

The fuel cell may comprise several plates, referred to as bipolar plates, for example made of metal, stacked on top of one another. The membrane is positioned between two bipolar plates. The bipolar plates may comprise flow channels and manifolds in order to guide the reactants and the products to/from the membrane, in order to guide coolant, and in order to separate various compartments. The bipolar plates are also electrically conductive in order to form collectors of the electrons generated at the anode. The bipolar plates also have a mechanical role of transmitting the stack clamping forces, necessary for the quality of the electrical contact. Gas diffusion layers are inserted between electrodes and the bipolar plates and are in contact with the bipolar plates.

Electron conduction is carried out through the bipolar plates, ion conduction being obtained through the membrane.

The bipolar plates continuously supply the reactive surfaces of the electrodes with reactants, as they are consumed. The distribution of the reactants at the electrodes should be as homogeneous as possible over the whole of their surface. The bipolar plates comprise networks of flow channels which provide for the distribution of the reactants. A network of flow channels is dedicated to the anode fluid and a network of flow channels is dedicated to the cathode fluid. The networks of anode and cathode flow channels are never in communication inside the fuel cell, in order to prevent direct combustion of the fuel and the oxidant. The reaction products and the unreactive entities are discharged by entrainment by the flow as far as the outlet of the networks of distribution channels. In the majority of the architectures encountered, the bipolar plates comprise flow channels traversed by coolant, making possible the discharge of the heat produced.

Three methods of circulation of the reactants in the flow channels are mainly distinguished:
  serpentine channels: one or more channels run across the entire active surface in several to-and-from paths;
  parallel channels: a bundle of parallel and through channels runs across the active surface from side to side;
  interdigital channels: a bundle of parallel and blocked channels runs across the active surface from side to side. Each channel is blocked either from the fluid inlet side, or from the fluid outlet side. The fluid entering a channel is then forced to pass locally through the gas diffusion layer in order to join an adjacent channel and then reach the fluid outlet of this adjacent channel.

The requirements of miniaturization and of compactness are henceforth increasingly important in many fields of application of fuel cells. Thus, it is essential to reduce the bulkiness of the fuel cell and in particular the thickness of the bipolar plates. One means typically used for doing this is to reduce the size of the flow channels. However, this generates large pressure drops in the interdigital or serpentine channels, which reduces the fuel cell performance.

Parallel channels are therefore used, which are then less subject to the pressure drops. But, in this case, the production of the flow plate is complicated, due to the parallelism of the flow channels, since it then becomes difficult to position the flow manifolds, through which the reactants are transported between the outside of the bipolar plate and their respective flow channels, without causing excessive bulkiness of the bipolar plate.

In order to overcome this, use is typically made of a bipolar plate comprising a homogenizing zone, to which the flow manifolds and the parallel channels are fluidically coupled, as described by document WO 2010/054744 A1, for example in FIG. 1 of this document.

The bipolar plate comprises a second group of channels, referred to as supply channels, forming the homogenizing zone and which guide the reactants between the flow manifolds and the parallel channels. These supply channels extend along directions different to those of the parallel channels. This makes it possible to position the flow manifolds in an offset manner with respect to one another, so as to reduce the bulkiness thereof.

This solution has however the drawback of giving rise to the appearance, between the flow channels, of a pressure difference of the reactants circulating in these flow channels, since the supply channels of the homogenizing zone then have different lengths. A pressure difference between the flow channels is disadvantageous, since it unbalances the operation of the fuel cell by making appear therein zones that are poorly supplied with reactants, or by making appear therein disparities of the reaction conditions. No known solution makes it possible to simultaneously reconcile a great compactness of the homogenizing zone and homogeneous pressures at the inlet of the flow channels.

Document US 2011/165500 describes a fuel cell equipped with a stack of bipolar plates. A wall is made between supply channels and flow channels of a reactive zone. The wall extends over the entire height of the flow channels in order to act as a gasket. Discreet orifices are made in the wall, in order to place the feed channels in communication with the flow channels. Such a structure induces considerable pressure drops and does not make it possible to guarantee a sufficient pressure homogeneity at the inlet of the flow channels.

Document US 2011/207018 A1 describes a fuel cell structure. A separator plate comprises feed channels and flow channels of a reactive zone. The feed channels are separated from the flow channels by a succession of walls. The walls extend over the entire height of the flow channels in order to support a proton exchange membrane of the fuel cell. Orifices are made in the walls in order to place the feed channels in communication with the flow channels. Such a structure also induces considerable pressure drops and does not make it possible to guarantee a sufficient pressure homogeneity at the inlet of the flow channels.

The invention aims to solve one or more of these drawbacks. The invention thus relates to a fluid flow guide plate for an electrochemical reactor, as defined in the appended claims.

According to another aspect, the invention relates to a unit for an electrochemical reactor as defined in the appended claims.

Other features and advantages of the invention will become clearly apparent from the description that is given thereof below, by way of nonlimiting illustration, and with reference to the appended figures, in which.

Figure 2:
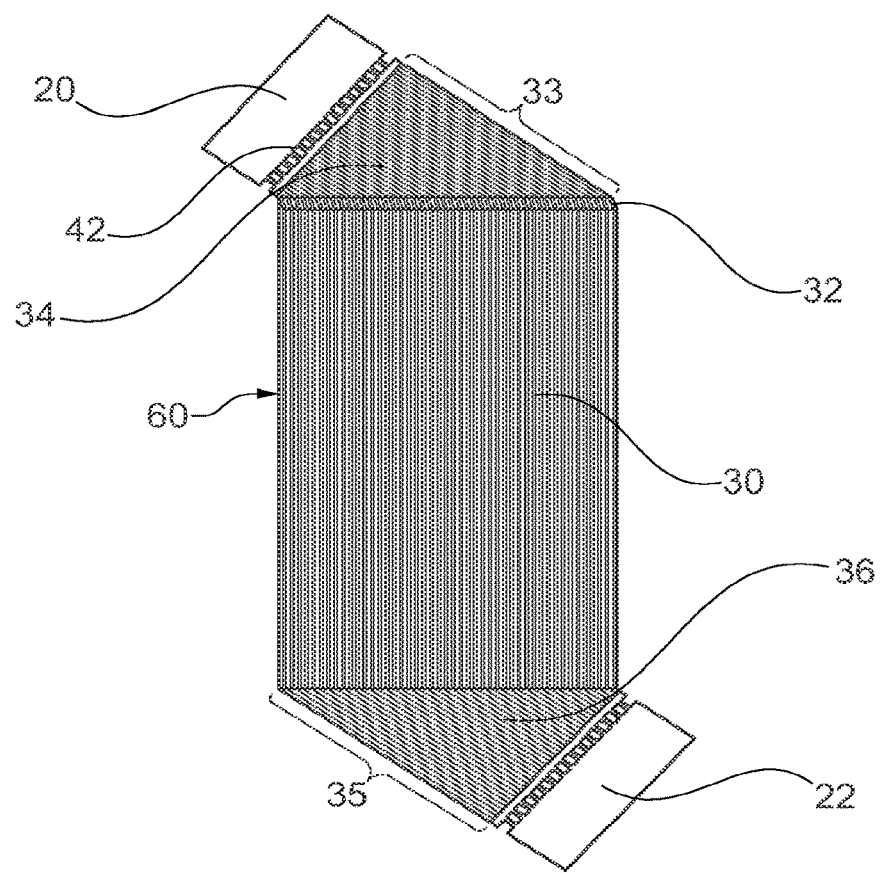
FIG. 2 illustrates, as a top view, a portion of a bipolar plate of the unit from FIG. 1.
Figure 3:
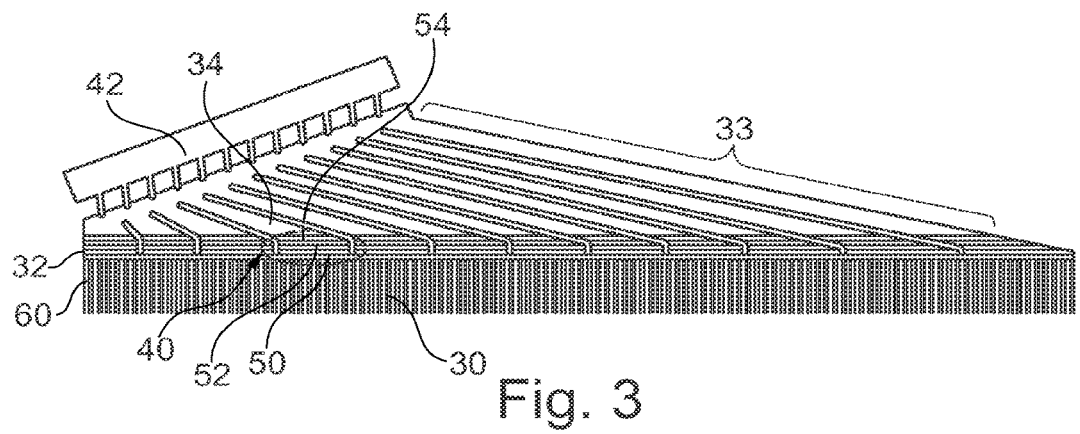
Figure 4:
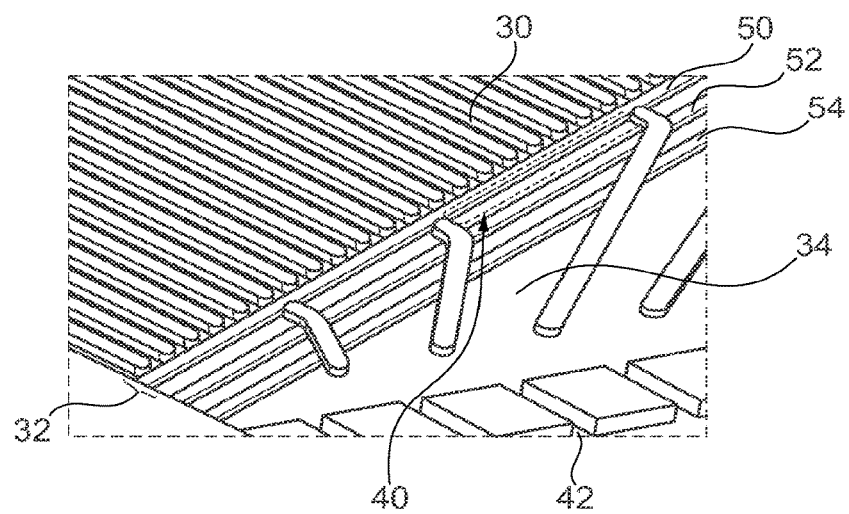
Figure 5:
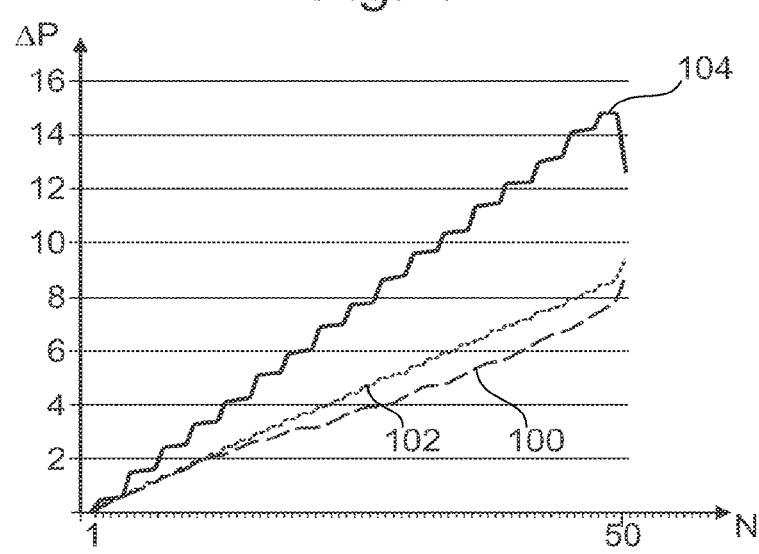
Figure 6:
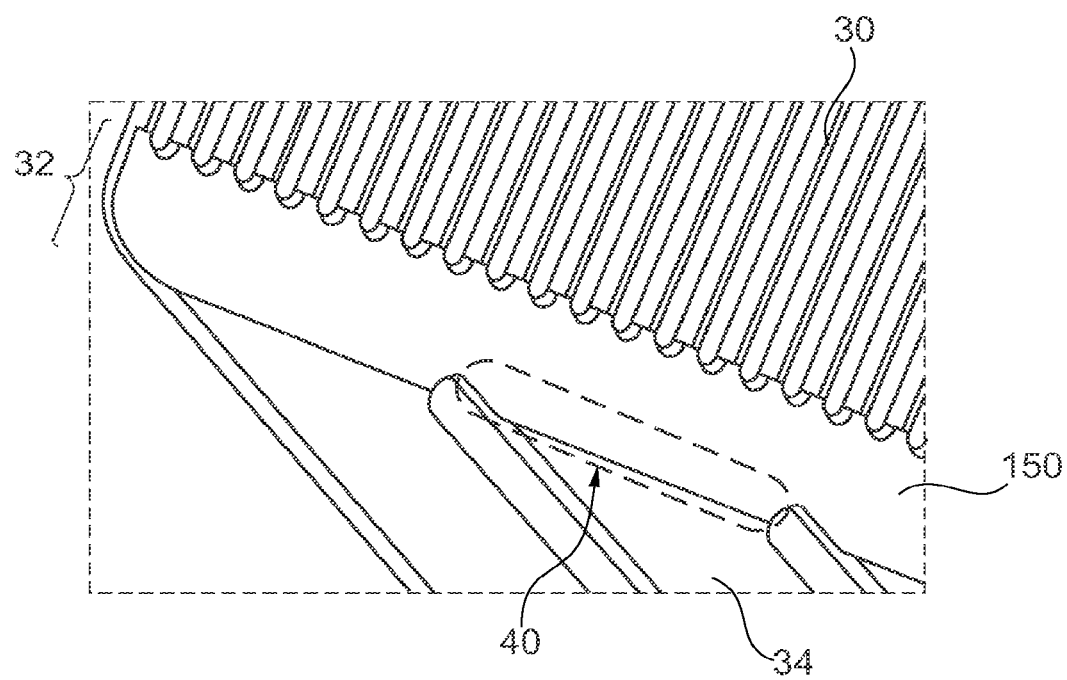

FIGS. 3 and 4 schematically illustrate, as a partial view, an exchange channel of the plate from FIG. 2;

FIG. 5 schematically illustrates a fluid pressure gradient at the inlet of flow channels of the plate from FIGS. 3 and 4;

FIG. 6 schematically illustrates another embodiment of the exchange channel from FIGS. 3 and 4.

Figure 1:
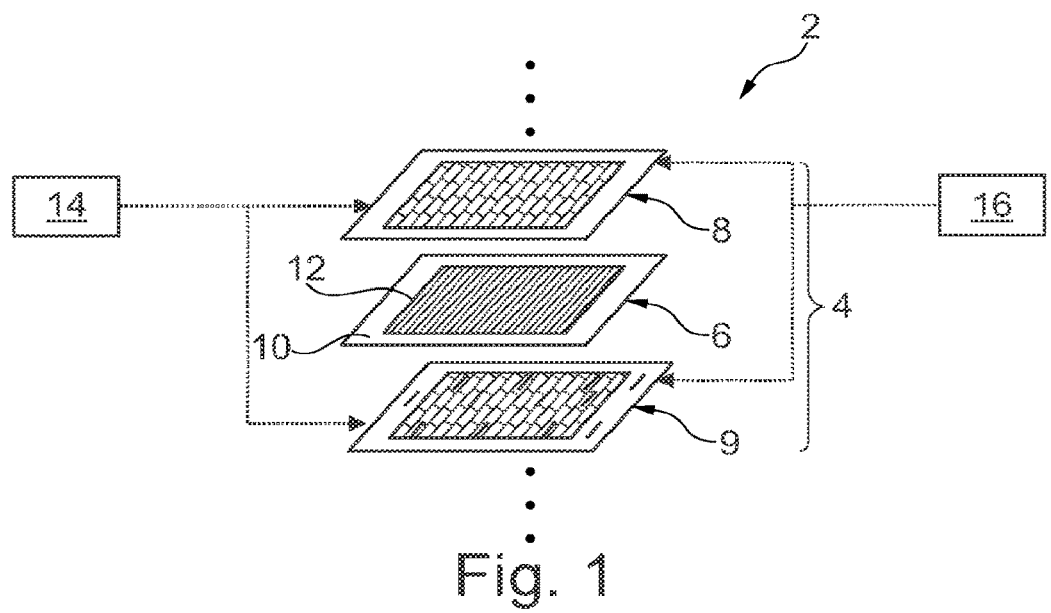
FIG. 1 illustrates, as an exploded perspective view, an example of an electrochemical reactor including a unit comprising a membrane electrode assembly and bipolar plates for a fuel cell.

FIG. 1 represents an electrochemical reactor 2, such as a fuel cell. This reactor 2 comprises a unit 4 formed of a membrane electrode assembly 6 (denoted MEA) and of bipolar plates 8, 9 superposed on one another. Generally, the reactor 2 comprises a plurality of units identical to the unit 4 and superposed on one another. Each plate 8, 9 is in contact with two MEAs. But, in order to simplify the description, only the unit 4 is described in detail.

Each MEA 6 comprises an electrolyte 10, a cathode (not illustrated) and an anode 12 placed on either side of the electrolyte and fastened to the opposite faces of this electrolyte 10. The electrolyte layer 10 forms a semipermeable membrane that allows proton conduction while being impermeable to the gases present in the unit. The electrolyte layer also prevents passage of the electrons between the anode 12 and the cathode.

The MEA 6 here has a flat form.

The plates 8, 9 are configured to supply the MEA 6 with a fluid such as fuel or oxidant. In this example, each plate 8, 9 defines, on one of its outer faces, a set of anodic flow channels and, on the other outer face located opposite, a set of cathodic flow channels. Each outer face thus defines a flow guide plate for a fluid. These flow channels will be defined in greater detail in what follows. The plates 8, 9 also define coolant flow channels (not represented) that are part of the cooling circuit.

Here, on each of the two faces of the MEA 6, a bipolar plate 8, 9 is positioned. The bipolar plates 8 and 9 are turned so that:

the face of the plate 8 that is in contact with the MEA 6 defines one or other of the sets of anodic or cathodic flow channels, and the face of the plate 9 that is in contact with the MEA 6 defines the other of the sets of anodic or cathodic flow channels.

Advantageously, the invention is carried out on the anodic face of a bipolar plate 8, 9.

Here, the plates 8, 9 are identical. Thus, subsequently, only the plate 8 will be described in detail.

The plates 8 may be formed in a manner known per se from one or more conductive metal sheets, for example made of stainless steel, or titanium alloy, aluminum alloy, nickel alloy or tantalum alloy. The plates 8 may also be obtained by other processes, such as molding or injection using carbon-polymer composites. The unit 4 may also comprise peripheral sealing gaskets and membrane reinforcements, not illustrated here.

The reactor 2 also comprises sources, or reservoirs, of fuel 14 and of oxidant 16. The sources 14 and 16 are both connected to the unit 4 in order to supply it with fuel and oxidant.

In a manner known per se, during the operation of the reactor 2, fuel flows between the MEA and a bipolar plate, and oxidant flows between this MEA and another bipolar plate. Here, as the reactor 2 is a fuel cell, the fuel is molecular hydrogen and the oxidant is molecular oxygen. The unit 4 here also has a cooling circuit (not represented in the figures).

At the anode, the molecular hydrogen is ionized in order to produce protons that pass through the MEA. The electrons produced by this reaction are collected by a plate 8. The electrons produced are then applied to an electrical load connected to the fuel cell 2 in order to form an electric current. At the cathode, oxygen is reduced and reacts with the protons to form water. The reactions at the anode and the cathode are governed as follows:

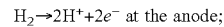

$H_2 \rightarrow 2H^+ + 2e^-$ at the anode;

$4H^+ + 4e^- + O_2 + 2H_2O$ at the cathode.

During its operation, the unit 4 of the fuel cell usually generates a DC voltage between the anode and the cathode of the order of 1 V.

FIG. 2 represents the plate 8 in greater detail. The plate 8 comprises, on one and the same face:

flow manifolds 20 and 22;

a flow network comprising a plurality of flow channels 30, extending along an axis referred to as a longitudinal axis;

a first exchange channel 32, extending along a direction transverse to the longitudinal axis of the channels 30;

a first supply network 33, formed of a plurality of first supply channels 34;

a second supply network 35, formed of a plurality of second supply channels 36.

The channels 30, 34 and 36 are made on the plate 8 in order to allow the flow of a fluid between the manifolds 20 and 22. This fluid is for example the fuel or the oxidant. In this example, it is the fuel $H_2$. For this purpose, the manifold 20 is fluidically connected to the reservoir 14. The manifold 22 is connected to a device for recovering residues of the reaction (not represented). In this example, the fluid flows from the manifold 20 to the manifold 22.

Here, these channels 30, 32, 34 and 36 are made on the face of the plate 8 which is turned toward the MEA 6. In this example, the channels are formed by a depression in the plate 8. They are covered by the MEA 6, which enables the fluid to circulate in these channels without leaking outside of the unit 4. In order to measure the transverse cross section of a channel, it is however considered that each channel is delimited, over its upper portion, by a virtual plane, parallel to the plane of the plate 8 and passing through the upper end of the channels. Indeed, typically, the MEA 6 is not perfectly flat and may locally exhibit sagging due to a low stiffness. Here, for each plate 8, 9, the qualifier "upper" refers to the part of the plate 8, 9 that is closest to the MEA 6.

The channels 30 extend here longitudinally and parallel to one another. The channels 30 all have the same length here. Advantageously, the channels 30 all have the same transverse cross section. In this description, the transverse cross section of a channel is measured in a plane perpendicular to the plate 8.

For example, the number of channels 30 is greater than or equal to 10 or 20 or 50. The number of channels 30 is here less than or equal to 1000 or 100. The channels 30 here have a length between 1 cm and 100 cm.

It is at the channels 30 that the electrochemical reactions take place during the operation of the reactor. More specifically, a reaction zone of the unit 4 is defined as being the zone of superposition of the channels 30 of the plate 8 and of the channels 30 of the plate 9 when the plates 8 and 9 are superposed.

Each channel 34 is fluidically connected:
on the one hand, by a first end to the manifold 20, and
on the other hand, by a second end 40, to the channel 32.

The channels 34 extend longitudinally, here essentially along a direction different from that of the channels 30. Here, these channels 34 are parallel to one another. The straight line along which the channels 34 extend has an angle greater than or equal to 30° relative to the longitudinal axis.

This positioning of the channels 34 makes it possible to place the manifold 20 in an offset manner relative to the channels 30 and makes it possible to offset the various channels with respect to one another. Owing to this, it is possible to place other manifolds on the plate 8, such as manifolds for the cooling circuit or for the oxidant. This contributes to an improvement in the compactness of the unit 4 and therefore of the reactor 2.

The channels 34 also favor a better homogenization of the pressure of the fluid that circulates in all these channels, so as to limit the appearance of a pressure gradient between the channels 34 distant from the network 33. A homogenizing zone of the unit 4 is defined as being the zone of superposition of the channels 34 of the plate 8 and of the channels 34 of the plate 9 when the plates 8 and 9 are superposed. The homogenizing zone may also be defined by a zone of the stack where the electrodes of the MEAs do not cover the channels 34. Due to their angles with respect to the channels 30, the channels 34 have lengths that are different from one another. Here, the network 33 has a triangular shape, one of the sides of which is formed by the channel 32 and another side of which is formed by a coupling interface 42, or injection orifices, of the first ends of the channels 32 to the manifold 20.

The width of the channels 34, measured at mid-depth of these channels, is chosen to be large enough not to generate an excessive pressure drop for the fluid that circulates therein, but narrow enough to ensure a mechanical support of the MEA 6 in order to prevent the latter from sagging within the channel, due to its low stiffness. For example, the width of a channel 34 is between 0.5*H and 10*H and, preferably, between 2*H and 3*H, H being the depth of the channel 34. This width is here greater than that of the channels 30. The channels 34 here all have a mutually identical width.

The channels 36 play the same role as the channels 34, with reference to the manifold 22. Here, the channels 36 are identical to the channels 34 except that their first respective end is fluidically connected to the manifold 22. Therefore, subsequently, only the channels 30, 32 and 34 will be described in detail.

FIGS. 3 and 4 represent the channel 32 in greater detail. The channel 32 places the channels 30 and 34 in communication with one another, so that the fluid can flow between the channels 30 and 34. The channel 32 places at least a third of the channels 30 in communication. Here, the channel 32 places all the channels 30 in communication with all the channels 34, in order to favor a flow pressure homogenization for all the channels 30.

The channel 32 also comprises at least one obstacle 50 for partially closing off the flow of the fluid between the ends 40 and the channels 30.

A continuous fluid flow area is made above the obstacle 50 along the transverse direction. This flow area extends continuously with respect to the flow channels 30, here over the entire length of the exchange channel 32. This fluid flow area having a height at least equal to 30% of the height of the channels 34. The height of the obstacle 50 is measured along a direction perpendicular to the plate. The height of the flow area corresponds to the height difference between the obstacle 50 and the top of the channels 30.

The obstacle 50 creates a restriction of the direct flow of the fluid between each channel 34 and each channel 30. The flow of the fluid is modified, so that at least a portion of the fluid is constrained to flow through the flow area, along the direction of the channel 32, within this channel 32. Thus, the flow of the fluid is distributed between several channels 30, which limits the pressure gradient of the fluid between the channels 30. Furthermore, the obstacle 50 induces a pressure drop, the order of magnitude of which is greater than the pressure drop of the flow through the channels 30.

Due to the fact that the flow area extends continuously with respect to the flow channels, the pressure homogenization is clearly carried out along the transverse direction for all of the channels 30, on top of the obstacle 50 which already favors this homogenization. The pressure in the flow area of the channel 32 is therefore relatively homogeneous and is homogenized all the more so as the channel 32 here places all of the channels 34 in communication.

In order not to induce an excessive pressure drop at the obstacle 50, the fluid flow area on top of the obstacle 50 has a height at least equal to 30% of the height of the supply channels 34. The height is measured here along a direction normal to the plate 8. The height of the flow area is advantageously between 40% and 60% of the height of the channels 34.

Preferably, the obstacle 50 makes a fluid flow area at least 30% or 40% less than the sum of the transverse cross sections of the ends 40, in order to induce a pressure drop that sufficiently favors the pressure homogenization. For this purpose, the obstacle 50 is made between each end 40 and the channels 30. The obstacle 50 has a height for example at least equal to 30%, or even at least equal to 50% of the height of the channels 34. The height is measured here along a direction normal to the plate 8.

Advantageously, the transverse cross section of the obstacle 50 is at least equal to half of the transverse cross section of the channel 32 (cross section extending along the length of the channel 32).

In this example, the obstacle 50 is formed by a longilineal boss extending all along the channel 32. The obstacle 50 is for example obtained by deformation of the plate 8. This boss has a height less than or equal to 30% or less than or equal to 50% of the width of the channel 32 (the width of the channel 32 being able to be defined as the distance between the channels 30 and the channels 34). This height and this width are here measured along the longitudinal axis of the plate 8.

FIG. 5 represents the change in the pressure gradient at the inlet of the channels 30 with or without the obstacle 50. The pressure is that of the fluid at the inlet of the channels 30, that is to say here at the end thereof that is connected to the channel 32. The graph represents on the x-axis an index N solely identifying a channel 30 and, on the y-axis, for a given channel, the absolute value of the pressure difference ΔP, expressed in kPa, between this channel 30 and a reference channel. Taken here as the reference channel is the channel located on the edge of the flow network that is facing the channel 34 that has this shortest length. This reference channel bears the reference 60 in FIG. 2. The channels 30 are here indexed continuously and increasingly from this channel 60 up to the channel 30 that is found on the opposite edge of the flow network.

The curve and 100 corresponds to the case where the channel 32 comprises an obstacle 50. The curves 102 and 104 correspond to the cases where the channel 32 and the obstacle 50 are omitted and where each channel 34 is directly coupled, respectively, to 2 or 4 channels 30.

The results are derived from numerical flow simulations using computational software such as Fluent® or Solidworks Fluid Simulation®. Here, the pressure of the fluid after entering the manifold 20 is 1.5 Pa. The fluid has, at the end 40 of the channels 34, a pressure difference of 10 kPa between the channels 34 located at the opposite edges of the zone 33. This is caused by the different length of the channels 34. Specifically, here, the pressure drop of the fluid in the channels 34 is constant per unit of length. The pressure drop at the outlet of the channels 34 is therefore lower for those that have a reduced length.

It is observed that in the case where the obstacle 50 is used (curve 100), the pressure difference is lower compared to the cases where the obstacle 50 is omitted and where the channels 34 are directly connected to the channels 30.

Advantageously, the plate 8 comprises secondary obstacles 52, 54 (FIGS. 3, 4). In this way, they act as mechanical support for the MEA 6. Specifically, if the channel 32 was too wide and the obstacle 50 too far away from the ends 40 or from the channels 30, the MEA 6 would run the risk of deforming and mechanically coming into contact with the bottom of the channel 32, since the MEA 6 typically has a low stiffness.

These obstacles 52, 54 here have identical dimensions (height, and width along the flow direction) to the obstacle 50.

FIG. 6 represents an obstacle 150 capable of replacing the obstacle 50. This obstacle 150 is formed by a raising of the bottom of the channel 32 relative to the respective bottoms of the channels 30 and 34. This raising extends over the entire length and width of the channel 32.

Many other embodiments are possible.

Each bipolar plate 8, 9 may include two attached flow guide plates. In this case, the respective plates 8, 9 may each be formed of two sheets fastened back to back by adhesive bonding or by assembling.

The fluid may be different. The invention of course also applies to the injection of other types of fuels, for example methanol.

The flow direction of the fluid may be different. For the sake of simplification, the solution of the invention was described only for the flow of the fuel. The invention also applies to the flow of the oxidant from an inlet manifold, through the flow channels, to an outlet manifold.

As a variant, the channels 30 and/or 34 have a non-rectilinear shape. For example, the channels 30 and/or 34 extend along an essentially longitudinal direction that has undulations. The invention is not limited to the case of parallel channels and applies to bipolar plates whose channels have interdigital channel or serpentine organization.

The channels 34 are not necessarily identical to one another and may have different shapes. In particular, the channels 34 may have widths that are different from one another.

An obstacle 50 may be produced differently. In particular, the obstacle 50 may be formed each by a plurality of island-shaped bosses placed, for each channel 34, facing the end 40 of this channel. These bosses are preferably distributed along the transverse direction. Preferably, each of these bosses has a width greater than or equal to 0.5 times or greater than or equal to 0.6 times or greater than or equal to 0.75 times the width of the end 40 of the channel 34 facing which this boss is placed. The width of a boss is here defined as being equal to the width of the boss, measured at its mid-height and along the transverse direction.

As a variant, the obstacle 50 is made not on the plate 8 but on the face of the MEA 6 that is turned towards the plate 8. This obstacle juts out from this face of the MEA 6 as far as the inside of the channel 32.

As a variant, the obstacles 52, 54 are produced differently from the obstacle 50. They may also be placed elsewhere, for example made between the obstacle 50 and the channels 30.

The invention claimed is:

1. A fluid flow guide plate for an electrochemical reactor, the plate comprising on one and a same face:
    a flow manifold;
    a plurality of flow channels, made on the plate to ensure flow of a fluid and extending along one and a same longitudinal direction;
    an exchange channel, extending along a direction transverse to the flow channels and placing the flow channels in communication with one another;
    a plurality of supply channels, made on the plate to ensure flow of a fluid, each supply channel extending along one and a same longitudinal direction and being fluidically connected:
       by a first end to the flow manifold, and
       by a second end, to the exchange channel;
    wherein the exchange channel comprises at least one obstacle made between each second end of the supply channels and the flow channels to partially close off flow between the second ends and the flow channels, a fluid flow area being made above the obstacle and extending continuously along the transverse direction with respect to the flow channels, the fluid flow area having a height at least equal to 30% of the height of the supply channels, the height of the obstacle being measured along a direction perpendicular to the plate.

2. The plate as claimed in claim 1, wherein the obstacle has a height at least equal to 30% of the height of the supply channels.

3. The plate as claimed in claim 2, wherein the obstacle has a height greater than or equal to half of the height of the supply channels.

4. The plate as claimed in claim 2, wherein the continuous fluid flow area has a height between 40% and 60% of the height of the supply channels.

5. The plate as claimed in claim 1, wherein the obstacle makes a flow area of the fluid at least 30% less than the sum of transverse cross sections in the second ends of the supply channels.

6. The plate as claimed in claim 1, wherein the obstacle includes a plurality of bosses each respectively placed in the exchange channel facing the second end of one of the supply channels, the bosses being distributed along the transverse direction.

7. The plate as claimed in claim 6, wherein each of the bosses has a width greater than or equal to 0.5 times the width of the second end of the flow channel facing which the obstacle is placed, the width of a boss being defined as equal to the width of the boss measured at its half-height and along the transverse direction.

8. The plate as claimed in claim 1, wherein the obstacle includes a common boss extending continuously inside the exchange channel along the transverse direction.

9. The plate as claimed in claim 1, wherein all the flow channels have one and a same transverse cross section.

10. The plate as claimed in claim 1, wherein the exchange channel places all of the supply channels of the face of the plate in communication.

11. The plate as claimed in claim 1, wherein the flow channels are parallel to one another.

12. The plate as claimed in claim 1, wherein the obstacles form at least one height restriction for any direct flow between each supply channel and each flow channel.

13. A unit for an electrochemical reactor comprising:
a membrane electrode assembly; and
first and second fluid flow guide plates, each as claimed in claim 1, the first and second plates being fastened to opposite faces of the membrane electrode assembly to enable flow of fluids to pass through the membrane electrode assembly;
the flow channels of the first and second plates respectively forming reaction zones superposed with respect to one another, transportation channels of the first and second plates respectively forming exchange zones superposed with respect to one another.

* * * * *